(12) United States Patent
Knudson et al.

(10) Patent No.: US 7,620,596 B2
(45) Date of Patent: Nov. 17, 2009

(54) SYSTEMS AND METHODS FOR EVALUATING FINANCIAL TRANSACTION RISK

(75) Inventors: Sean Knudson, Englewood, CO (US); Robert Allen Bulkley, Castle Rock, CO (US); Lisa Aiello Nafe, Denver, CO (US); Hollis Alford Baugh, II, Denver, CO (US); Blaine LaVelle Newby, Centennial, CO (US); Kevin Favreau, Denver, CO (US); Robert Allen Cambron, Bennett, CO (US)

(73) Assignee: The Western Union Company, Englewood, CO (US)

( * ) Notice: Subject to any disclaimer, the term of this patent is extended or adjusted under 35 U.S.C. 154(b) by 42 days.

(21) Appl. No.: 11/757,255

(22) Filed: Jun. 1, 2007

(65) Prior Publication Data

US 2008/0301040 A1    Dec. 4, 2008

(51) Int. Cl.
*G06Q 40/00*    (2006.01)
(52) U.S. Cl. .......................................... 705/38; 705/39
(58) Field of Classification Search .................. 705/35, 705/38
See application file for complete search history.

(56) References Cited

U.S. PATENT DOCUMENTS 6,015,087 A    1/2000    Seifert et al.

| 2001/0010458 | A1* | 8/2001 | Ohshima .................... 323/282 |
| 2002/0099637 | A1  | 7/2002 | Wilkinson et al. |
| 2003/0158782 | A1* | 8/2003 | Thomson et al. .............. 705/17 |
| 2003/0167237 | A1  | 9/2003 | Degen et al. |
| 2004/0010458 | A1  | 1/2004 | Friedman |
| 2004/0215558 | A1  | 10/2004 | Morales et al. |
| 2004/0215574 | A1  | 10/2004 | Michelsen et al. |
| 2004/0230527 | A1* | 11/2004 | Hansen et al. ................. 705/40 |
| 2006/0089894 | A1  | 4/2006 | Balk et al. |

* cited by examiner

*Primary Examiner*—Kambiz Abdi
*Assistant Examiner*—Lindsay M. Maguire
(74) *Attorney, Agent, or Firm*—Townsend and Townsend and Crew LLP

(57) ABSTRACT

Methods and systems are provided for evaluating the risk of conducting financial transaction such as money transfers through representatives. In one embodiment, information generated by a money transfer system regarding a plurality of financial transactions conducted by one or more representatives are received, records of the information are stored in a transaction database, a risk processor is configured to access the transaction database and retrieve risk element data related to transactions conducted by the representative and an analysis of the risk element data is performed using the risk processor. The risk processor may be configured to process the risk element data into one or more risk element values and to calculate a Transaction Risk Index for the representative by comparing one or more of the risk element values to an appropriate risk proxy.

13 Claims, 6 Drawing Sheets

|  | RISK | ELEMENT | VALUES |
|---|---|---|---|
| RISK ELEMENT DATA | REPRESENTATIVE A | REPRESENTATIVE B | REPRESENTATIVE C |
| ID Number | 12 | 34 | 43 |
| Name Last | Smith | Jones | Johnson |
| Name First | John | Bob | Sam |
| Address Street | 78 Broadway | 910 Main | 1112 Main |
| Address City | Denver | Denver | Aurora |
| Address Zip Code | 80202 | 80246 | 80012 |
| Network ID | ABC | DEF | GHI |
| Start Date | 1/12/72 | 10/26/00 | 2/18/06 |
| Review Rating | 8 | 9 | N/A |
| Last Review Date | 4/12/06 | 4/12/06 | N/A |
| Av Mo Pay Vol | $30K | $50K | $20K |
| Av Mo Send Vol | $35K | $40K | $40K |
| Av Mo Pay Trans. | 20 | 25 | 3 |
| Av Mo Send Trans | 30 | 26 | 5 |
| Pay/Send Ratio | 1:1 | 1:1 | 1:4 |
| Intl/Dom Pay Ratio | 1:1 | 1:3 | 1:5 |
| Int/Dom Send Ratio | 1:1 | 1:3 | 1:15 |
| HIJ Trans | 0 | 3 | 10 |
| HIFCA/HIDTA Trans | 0 | 1 | 5 |
| % Trans Out Hours | 0 | 0 | 2 |
| SAR Failures | 2 | 5 | 6 |
| Send $1K Avoidance | 1 | 1 | 0 |
| Send $3K Avoidance | 0 | 1 | 0 |
| Send $10K Avoidance | 0 | 0 | 2 |
| Send ID Sharing | 1 | 3 | 6 |
| Pay ID Sharing | 0 | 1 | 1 |
| Send SSN Sharing | 0 | 0 | 0 |
| Pay SSN Sharing | 0 | 1 | 1 |
| Send >$25K/30 Day | 0 | 0 | 0 |
| Pay >$25K/30 Day | 0 | 2 | 4 |
| Rec >$3K/1 Day | 0 | 0 | 0 |
| Rec > 5 Trans/Wk | 0 | 0 | 1 |
| Send > 5 Trans/Wk | 0 | 0 | 9 |
| No.Cons > 50% Vol.. | 12 | 15 | 2 |

|  | | RISK PROXIES | |
| --- | --- | --- | --- |
| RISK ELEMENT DATA | Low Risk Proxies (Risk Score=0) | Moderate Risk Proxies (Risk Score =0.5) | High Risk Proxies (Risk Score=1.0) |
| ID Number | 1-20, 23, 45 | 21, 22, 30-40 | 24-29, 41-45 |
| Address Zip Code | 80202-80230 | 80246, 80240 | 80010-80020 |
| Network ID | ABC, DEF | GHI, JKL, MNO | PQR |
| Start Date | Before 1/1/85 | 1/1/85-1/1/2005 | After 1/1/2005 |
| Review Rating | 1-4 | 5-8 | 9-10, None |
| Last Review Date | After 1/1/06 | 1/1/00-12/31/05 | Before 1/1/06, None |
| Av Mo Pay Vol | $1K-$20K | $30K-$50K | > $50K |
| Av Mo Send Vol | $1K-$20K | $30K-$50K | > $50K |
| Av Mo Pay Trans. | > 30 | 10-30 | < 10 |
| Av Mo Send Trans | > 30 | 10-30 | < 10 |
| Pay/Send Ratio | < 1:1 | 1:1-1:2 | > 1:2 |
| Intl/Dom Pay Ratio | < 1:5 | 1:5-1:10 | > 1:10 |
| Int/Dom Send Ratio | < 1:50 | 1:5-1:10 | > 1:10 |
| HRJ Trans | 0-3 | 4-9 | > 10 |
| HIFCA/HIDTA Trans | 0-3 | 4-9 | > 10 |
| % Trans Out Hours | 0-5 | 6-10 | > 10 |
| SAR Failures | 0-2 | 3-5 | > 5 |
| Send $1K Avoidance | 0-3 | 4-10 | > 10 |
| Send $3K Avoidance | 0-3 | 4-10 | > 10 |
| Send $10K Avoidance | 0-2 | 3-5 | > 5 |
| Send ID Sharing | 0-2 | 3-5 | > 5 |
| Pay ID Sharing | 0-2 | 3-5 | > 5 |
| Send SSN Sharing | 0-2 | 3-5 | > 5 |
| Pay SSN Sharing | 0-2 | 3-5 | > 5 |
| Send >$25K/30 Day | 0-1 | 2-3 | > 3 |
| Pay >$25K/30 Day | 0-1 | 2-3 | > 3 |
| Rec >$3K/1 Day | 0-4 | 5-10 | > 10 |
| Rec > 5 Trans/Wk | 0-3 | 4-8 | > 8 |
| Send > 5 Trans/Wk | 0-3 | 4-8 | > 8 |
| No.Cons > 50% Vol.. | >30 | 5-29 | < 5 |

|  | RISK SCORES | | |
|---|---|---|---|
| RISK ELEMENT DATA | REPRESENTATIVE A | REPRESENTATIVE B | REPRESENTATIVE C |
| ID Number | 0 | 0.5 | 1 |
| Address Zip Code | 0 | 0.5 | 1 |
| Network ID | 0 | 0 | 0.5 |
| Start Date | 0 | 0.5 | 1 |
| Review Rating | 0.5 | 1 | 1 |
| Last Review Date | 0 | 0 | 1 |
| Av Mo Pay Vol | 0.5 | 0.5 | 0 |
| Av Mo Send Vol | 0.5 | 0.5 | 0.5 |
| Av Mo Pay Trans. | 0.5 | 0.5 | 1 |
| Av Mo Send Trans | 0.5 | 0.5 | 1 |
| Pay/Send Ratio | 0 | 0 | 0 |
| Intl/Dom Pay Ratio | 0 | 0 | 0 |
| Int/Dom Send Ratio | 0 | 0 | 1 |
| HIJ Trans | 0 | 0 | 0 |
| HIFCA/HIDTA Trans | 0 | 0 | 0 |
| % Trans Out Hours | 0 | 0 | 0 |
| SAR Failures | 0 | 0.5 | 1 |
| Send $1K Avoidance | 0 | 0 | 0 |
| Send $3K Avoidance | 0 | 0 | 0 |
| Send $10K Avoidance | 0 | 0 | 0 |
| Send ID Sharing | 0 | 0.5 | 1 |
| Pay ID Sharing | 0 | 0 | 0 |
| Send SSN Sharing | 0 | 0 | 0 |
| Pay SSN Sharing | 0 | 0 | 0 |
| Send >$25K/30 Day | 0 | 0 | 0 |
| Pay >$25K/30 Day | 0 | 0.5 | 1 |
| Rec >$3K/1 Day | 0 | 0 | 0 |
| Rec > 5 Trans/Wk | 0 | 0 | 0 |
| Send > 5 Trans/Wk | 0 | 0 | 1 |
| No.Cons > 50% Vol.. | 0.5 | 0.5 | 1 |
| TRANSACTION RISK INDEX | 3.0 | 6.5 | 14.0 |
| RISK CLASSIFICATION | Low risk (1-5) | Moderate risk (6-10) | High risk (> 10) |

FIG. 6

SYSTEMS AND METHODS FOR EVALUATING FINANCIAL TRANSACTION RISK

BACKGROUND OF THE INVENTION

The present invention relates generally to financial transactions, particularly money and value transfer transactions. More specifically, the present invention is directed to methods and systems for identifying, evaluating and reducing the exposure of a financial transaction service provider to risk arising from using representatives to conduct financial transactions, particularly risks associated with the abuse of financial transaction systems by the service provider's representatives.

Various procedures currently exist to curb the abuse of financial transaction systems by criminals, including those associated with organized crime, drug dealers, terrorist organizations and the like. "Money laundering" is the practice of engaging in specific financial transactions in order to conceal the identity, source and/or destination of money associated with illegal activities. Anti-money laundering laws in some countries (referred to herein as "AML"), such as the U.S. Bank Secrecy Act (referred to herein as "BSA"), may require financial transaction processors to monitor, investigate and report transactions of a suspicious nature to the authorities. For example, a service provider may be a money service business ("MSB") that is required to submit a Suspicious Activity Report ("SAR") for any cash transaction where the consumer is suspected of trying to avoid BSA reporting requirements. The service provider may be subject to potential penalties, including heavy fines and regulatory restrictions, for failing to properly file SAR's and/or otherwise comply with BSA requirements.

A service provider may enlist a third party entity (referred to herein as a "financial transaction representative" or "representative") to accomplish money transfer transactions. As used herein, the term "representative" includes, but is not limited to, a Western Union Agent that has executed a Western Union Agency Agreement and is sometimes referred to as an "Agent". Such representatives may be, for example, merchants, financial institutions, etc. that interact with consumers at a remote location in the transaction process. Typical transactions may include purchase or redemption of money orders, travelers checks and the like; wire transfers of money or other value; money transfers; cash advances; the loading of money or value onto smart cards and stored value cards, and the like. The service provider runs the risk that the representative may not comply with AML/BSA requirements and therefore expose the provider to penalties and/or other sanctions (referred to herein as "AML/BSA" risk).

For these and other reasons, there is a need for a financial transaction service provider to implement systems and methods for quickly and efficiently identifying and measuring the AML/BSA risk of financial transactions conducted by financial transaction representatives, and for taking the appropriate corrective action, if necessary.

BRIEF SUMMARY OF THE INVENTION

The present invention includes a variety of embodiments of both systems and methods for identifying and measuring the risk of conducting financial transactions through representatives. In one particular embodiment, the invention evaluates the risk of potential or actual AML/BSA violations by a U.S.-based ("domestic") representative in the conduct of financial transactions on behalf of a service provider. In one embodiment, a domestic representative may conduct a plurality of financial transactions using a service provider's value transfer system to transfer money or other value from and to one or more consumers. For example, the representative may send cash provided by a consumer and/or pay cash to a consumer through a money transfer system providing money transfer or "wire transfer" services.

An embodiment of a system in accordance with the present invention may include a money transfer system associated with a risk processing system. The money transfer system may receive information regarding a plurality of financial transactions involving one or more representatives conducting financial transactions on behalf of a service provider, including data related to predetermined elements of risk ("risk element data"), and electronically store records of the information in a transaction database. The risk processing system may comprise a computer ("risk processor") that is configured to access the information in the transaction database and retrieve risk element data that is related to one or more representatives. The risk processor is further configured to perform an analysis of the risk element data to calculate an index ("Transaction Risk Index") that represents the level of risk associated with using each representative to conduct financial transactions.

In one embodiment, the risk processor may be configured to process the risk element data for a particular representative into one or more risk element values. Risk element values may be stored by the risk processor in a database in preparation for analysis. The stored risk element values may be analyzed by the risk processor by comparing each risk element value to a certain predetermined risk indicator that serves as a proxy for risk, preferably AML/BSA risk ("risk proxy"). In some embodiments, different risk proxies may be established to represent different levels of risk for the same risk element. In some embodiments, the risk processor may be programmed to obtain a characteristic risk score ("risk score") for each risk element value. The risk score may be indicative of the level of AML/BSA risk represented by the risk element value and is calculated by comparing the risk element value with an appropriate risk proxy. In one embodiment, the risk processor may be programmed to calculate a Transaction Risk Index ("TRI") for each representative by adding together the individual weighted risk scores determined for each risk element value analyzed by the risk processor for that representative.

The TRI may be used to identify representatives that exhibit unacceptable AML/BSA risk and may require some corrective action to be taken by the service provider. For example, additional AML/BSA compliance training, oversight, or other remedial action may be provided by the service provider to representatives having certain TRI values, whereas no action may be taken for representatives having certain low TRI values, and representatives having unacceptably high TRI values may be removed by the service provider. In one embodiment, the risk processor may use the TRI to determine a risk classification for the representative. The risk classification may also be used as the basis for any corrective action required by the service provider in regard to the representative.

Risk element data may include any data collected in the course of a financial transaction that relates to an element of risk, preferably AML/BSA risk. In preferred embodiments, risk element data may be included in four basic categories: representative complicity data, consumer data, transaction volume data and historical SAR-MSB compliance data. As examples of representative complicity data, mention may be made of data related to representative identification, product and/or services offered by the representative; geographic location; law enforcement history and internal review information. Examples of consumer data may be data related to consumer identification; number of transactions involving a single consumer over a time period; dollar volume of transactions involving a single consumer over a time period, and transactions involving a single consumer or group of consumers. Examples of transaction volume data may be data related to average and aggregate monthly dollar volume per product; average and aggregate monthly number of transactions per product or service; the ratio of international versus domestic transactions per product or service; the ratio of pay transactions versus send transactions per product or service; the number of international transactions involving High Risk Jurisdictions ("HRJ") per product or service; the number of domestic transactions involving High Risk Money Laundering and Related Financial Crimes Areas ("HIFCA") and/or High Intensity Drug Trafficking Areas ("HIDTA"); the percentage of transactions processed outside of listed business hours; and spikes in dollar volume or number of transactions. As examples of SAR-MSB compliance data, mention may be made of data related to the number of SAR's filed; the number of transactions in which a report would have to be filed to meet BSA and/or SAR requirements; and combinations thereof.

A risk proxy may comprise any criteria for evaluating risk element data that represents a certain level of risk, preferably AML/BSA risk. For example, in some embodiments, a risk proxy may comprise a predetermined value or range of values for a risk element data that indicates a suspicious money transfer activity. As some examples of risk proxies mention may be made of: a specified amount of average monthly dollar volume or number of pay or send transactions; a specified ratio of international transactions to domestic transactions; a specified ratio of pay transactions to send transactions; a specified number of transactions involving HRJ, HIFCA or HIDTA locations; a specified percentage of transactions processed outside of listed business hours; a specified number of SAR reports; a specified result from an internal review procedure; a specified proximity to suspended representatives; a specified number of detected incidents involving suspected "structuring" or detection avoidance activities; a specified number of transactions over a specified dollar amount involving a single consumer within a certain time period; a specified number of consumers comprising a majority of the representative's volume; and combinations thereof.

Various embodiments of methods in accordance with the present invention are also provided. One embodiment of a method for evaluating value transfers includes the steps of: receiving information from a money transfer system regarding a plurality of financial transactions conducted by one or more representatives, wherein the information includes risk element data; electronically storing records of the information in a transaction database; configuring a risk processor to access the transaction database and retrieve risk element data related to a first representative; and performing an analysis of the risk element data using the risk processor, wherein the risk processor is configured to process the risk element data into one or more risk element values and calculate a Transaction Risk Index ("TRI") for said first representative by comparing one or more of the risk element values to an appropriate risk proxy. In one embodiment, the risk element data may be processed to obtain a plurality of risk element values for the representative, and the TRI for the representative may be calculated by comparing each of the risk element values to an appropriate risk proxy, determining an individual risk score for each risk element value based on the comparison, and adding together the individual risk scores determined for all risk element values to obtain a total value equal to the TRI. Individual risk scores may be weighted or un-weighted. In another embodiment, risk element data may be retrieved for one or more other representatives and the risk processor may be used to calculate a TRI for each of the other representatives. In still another embodiment, a risk classification for the representative may be determined from the TRI.

The above summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the drawings to refer to similar components.

FIG. 3 represents an exemplary record of risk element values that may used in the practice of the invention.

FIG. 4 represents an exemplary record of risk proxies that may be used in the practice of the invention.

FIG. 6 represents an exemplary record of risk scores in accordance with the invention.

DETAILED DESCRIPTION OF THE INVENTION

Figure 1:
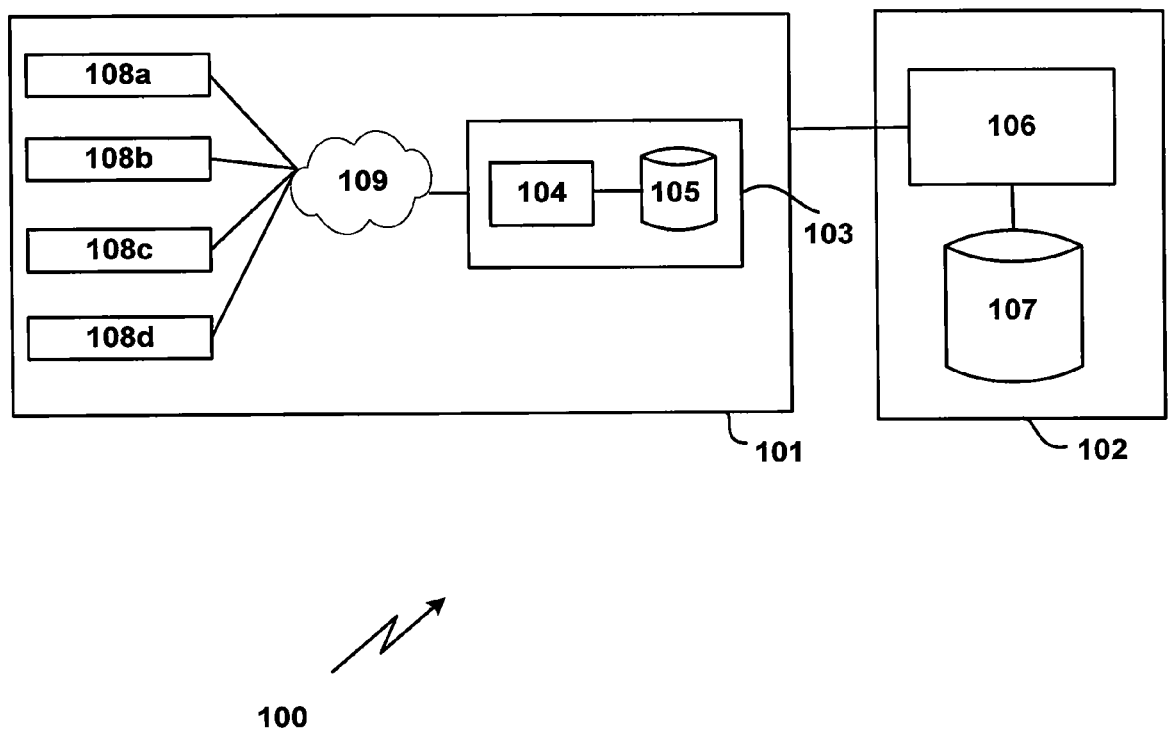
FIG. 1 illustrates system for assessing representative risk according to embodiments of the present invention.

According to one embodiment of the present invention, a financial transaction service provider may employ computerized systems and methods to identify and measure transaction-related AML/BSA risk at U.S.-based representative locations. The invention may also be useful for analyzing the risk of using representatives outside the U.S., and for analyzing risk other than AML/BSA risk. Using the systems and methods of the present invention, the provider may reduce its exposure to AML/BSA risk, efficiently identify representatives exhibiting behaviors that may indicate increased AML/BSA risk, develop a consistent approach to assessing representative AML/BSA risk and provide an enhanced risk-based representative evaluation process.

As used herein, a "financial transaction service provider" or "service provider" is an entity that performs a financial service or transaction, such as a money transfer or the transfer of other value. For example, "service provider" may refer to an entity, such as Western Union of Englewood, Colo., which provides a variety of such value transfer services. A service provider can be a "money services business" ("MSB") as defined by U.S. government regulations (e.g. see 31 CFR §103.11), and must comply with AML/BSA requirements. The MSB capacities in which a service provider may be acting include an issuer, seller and/or redeemer of money orders; an issuer, seller and/or redeemer of traveler's checks; a money transmitter, a check casher; a currency exchanger; a currency dealer; and an issuer, seller and/or redeemer of stored value. With few exceptions, an MSB is required to register with the U.S. Department of Treasury, prepare and maintain in a U.S. location a list of entities that the MSB has authorized to sell or distribute its MSB services (herein "representatives"), and report suspicious activity by filing a Suspicious Activity Report ("SAR").

Generally, an SAR must be filed when a transaction that is conducted or attempted by, at or through an MSB is both "suspicious" and involves a certain amount of money, e.g. $2000 or more for transactions identified by money transmitters. A transaction is "suspicious" if the MSB (or its representative) knows, suspects, or has reason to suspect that the transaction (or a pattern of transactions of which a transaction is a part):

1) involves funds derived from illegal activity or is intended or conducted in order to hide or disguise funds or assets derived from illegal activity; or is
2) designed to evade AML/BSA requirements, whether through "structuring" or otherwise; or
3) serves no business or apparent lawful purpose, and the reporting business knows of no reasonable explanation for the transaction after examining all available facts.

A SAR must be filed within 30 days after becoming aware of a suspicious transaction and supporting documentation must be retained for a period of five years from the date of filing. As previously indicated, other countries may also have similar compliance requirements, which are contemplated as being within the scope of the invention. The risk that any representative will fail to properly comply with applicable compliance requirements is referred to herein as "AML/BSA risk".

Although the present invention will be described in detail primarily in the context of money transfers or "wire transfers", other types of financial transactions may also benefit from the teachings herein. Thus, transactions to which the present invention applies may include money order purchases and/or redemptions, traveler's check purchases and/or redemptions, sending money to a recipient, receiving money from a sender, and the like.

The process of transferring money is well known. Briefly, a sender presents himself at a location of a financial transaction service provider or a representative, and provides value, usually cash, to an attendant. Transaction information is entered into a record that is received at a money transfer system. The record includes information that identifies the representative, sender, the recipient, and the amount of money being transferred, among other things. The recipient then presents himself to a receive site of a service provider or representative to obtain the transferred money or other value. An attendant at the receive site verifies and records the identity of the receiver and gives the receiver the value.

At the sending end of the transaction, the transaction information may be collected in any number of ways. In some cases, the information may be collected by a point-of-sale device specifically designed for money transfer transactions. The device may be operated by an attendant employed by a representative. In another case, the information may be collected using a computing device at a representative location running application software specifically designed for money transfer transactions. In yet another case, the information may be collected by phone when an attendant employed by a representative contacts a consumer service representative (CSR) of the service provider. The attendant is able to verify the sender's information and collect funds while the CSR enters the information into a transaction record. It also may be the case that the transaction is initiated by a representative who then must contact a CSR because the transaction exceeds certain thresholds. In yet another example, the consumer provides some information to a CSR at a remote location while also entering some information into a transaction processing device by, for example, "swiping" a card through a reader on the device. Other examples are possible, e.g. a web mobile device may be used.

Attention is directed to FIG. 1, which illustrates a representative risk evaluation system 100 according to one embodiment of the present invention. Risk evaluation system 100 may comprise a risk processing system 102 associated with a money transfer system 101.

Money transfer system 101 may be any of the known systems utilized to effectuate a money transfer. While FIG. 1 illustrates an exemplary money transfer mechanism, one of ordinary skill in the art will recognize other money transfer mechanisms to which the present invention may be applied or used in conjunction with. Examples of money transfer systems include those generally described in U.S. Patent Application Publication Nos. 2004/0215558 (Ser. No. 10/658, 844); 2004/0215574 (Ser. No. 10/424,558); and 2003/0167237 (Ser. No. 10/091,000), each of which is incorporated herein by reference in its entirety for all purposes.

In one embodiment, money transfer system 101 may include a transaction processing system 103 which comprises a transaction computer 104 and a transaction database 105. Transaction computer 104 may include, for example, server computers, personal computers, workstations, web servers, and/or other suitable computing devices. Transaction processing system 103 may include application software that programs transaction computer 104 to perform wire transfers. Transaction database 105 may be a storage device that includes solid state memory, such as RAM, ROM, PROM, and the like, magnetic memory, such as disc drives, tape storage, and the like, and/or optical memory, such as DVD. Transaction processing system 103 may be fully located within a single facility or may be distributed geographically, in which case a network may be used to integrate transaction processing system 103. Many other examples are possible and apparent to those skilled in the art in light of this disclosure. Network 109 may be the Internet, an intranet, a wide area network (WAN), a local area network (LAN), a virtual private network, any combination of the foregoing, or the like. Network 109 may include both wired and wireless connections, including optical links. In some embodiments, network 109 may be a transaction processing network. Through network 109, transaction devices 108 may communicate with transaction processing system 103.

Money transfer system 101 may include one or more transaction devices 108. For example, point-of-sale (POS) devices 108a may be located at representative locations offering financial transaction services. Examples of suitable POS devices are more fully described in U.S. Pat. No. 6,015,087, which is incorporated herein by reference in its entirety for all purposes. Essentially, POS devices are terminals for receiving transaction information; e.g. money transfer information, and sending the information to the transaction processing system 103. Terminal identification information can be associated with each POS device 108a. Such identification information includes, but is not limited to, a physical location, a telephone number, a representative identification number, a terminal identification number, a security alert status, an indication of the type of terminal, a serial number of a CPU, an IP address, the name of a clerk, and the like.

Money transfer system 101 also may include one or more computing devices 108b programmed to receive financial transaction information from consumers. Like the POS devices 108a, computing devices 108b may be located at representative locations.

Money transfer system 101 also may include one or more consumer service representative (CSR) computers 108c located at representative locations. The CSR computers 108c may be located, for example, at a call center operated by the representative or service provider. The CSR computers 108c function much like the POS devices 108a and the computing devices 108b, except that transaction information is entered by a CSR who is receiving the information from a consumer by phone, for example.

Money transfer system 101 may also include one or more receiving sites 108d from which consumers may receive funds. The receive sites 108d may be representative locations equipped with a POS device 108a or computing device 108b. The receive sites 108d also may be automated teller machines, kiosks, merchant store fronts, bank accounts, or the like.

Transaction computer 104 may process data received and transmitted via transaction network 109. All information processed by transaction computer 104 may conveniently be stored in transaction database 105.

Risk processing system 102 may include risk processor 106 and a risk element value database 107. Risk processor 106 may be any microprocessor-based device capable of retrieving risk element data that are collected in the course of a plurality of money transfers conducted by a particular representative and stored in transaction database 105. Risk processor 106 may be configured to process risk element data into risk element values. In one embodiment, risk processor 106 is configured to store the risk element values on risk elements database 107, and access risk element values for analysis. Processing of risk element data by processor 106 may include calculating risk element values, formatting risk element values and providing risk element values in an easily accessible form. In some embodiments, risk processor 106 may be a single computer, such as a personal computer or a database server. In other embodiments, risk processor 106 may be a group of two or more computers. In such embodiments, risk processor 106 may include a central computer associated with one or more peripheral computers. Such peripheral computers may be personal computers or portable devices, such as lap top computers and/or personal digital assistants.

Risk processor 106 may include a computer readable medium capable of maintaining instructions executable to perform the functions associated with risk processor 106. For example, as more fully described below, the computer readable medium may comprise software that allows risk processor 106 to access the risk element values stored in risk element value database 107, compare the retrieved risk element values to appropriate risk proxies and calculate a Transaction Risk Index from the comparison. In one embodiment, the software may also configure risk processor 106 to retrieve a plurality of risk element values from risk element value database 107, compare each of the risk element values to the appropriate risk proxy, determine an individual risk score for each risk element value based on the comparison, and calculate a Transaction Risk Index by adding together the individual risk scores calculated for each risk element value.

The computer readable medium can be any device or system capable of maintaining data in a form accessible to risk processor 106. For example, the computer readable medium can be contained in a hard disk drive either integral to risk processor 106 or external thereto. Alternatively, the computer readable medium can be contained in a floppy disk or a CD-ROM apart from risk processor 106 and accessible by inserting into a drive (not shown) of risk processor 106. In yet other alternatives, the computer readable medium can be contained in RAM integral to risk processor 106 and/or a microprocessor (not shown) within risk processor 106. One of ordinary skill in the art will recognize many other possibilities for implementing the computer readable medium. For example, the computer readable medium can be in a combination of the aforementioned alternatives, such as, a combination of a CD-ROM, a hard disk drive and RAM.

Risk processing system 102 may be associated with money system 101 in any manner that allows for access to transaction database 105. Such association can be provided by direct wired communication between transaction database 105 and risk processor 106, by direct or network communication between money system 101 and risk processor 106, or by any other mechanism that provides risk processing system 102 with access to transaction database 105. In one particular embodiment, risk processor 106 is communicably coupled to transaction network 109 and accesses transaction database 105 via transaction computer 104. In another embodiment, risk processor 106 is directly coupled to transaction computer 104 and accesses transaction database 105 via transaction computer 104. It will be recognized by one of ordinary skill in the art that a number of other mechanisms exist within the scope of the present invention for providing access by risk processor 106 to transaction database 105.

In some embodiments, transaction database 105 may maintain a record of transaction information received from a plurality of money transfer activities conducted by one or more representatives using money transfer system 101. Exemplary information maintained in transaction database 105 may include risk element data. Typical risk element data may fall into four general categories of data: representative complicity data, consumer biographical data, high volume index data and historical SAR-MSB compliance data.

Representative complicity data is data that is useful in determining whether a representative may be participating in one or more suspicious money transfer activities. Examples of representative complicity data may include: representative ID number; representative name and address; an internal code assigned as a unique identifier that is used to identify representatives within a given network (network/subnetwork ID's); the geographic region of a representative's responsibility (Designated Market.Area Indicator or "DMA Indicator"); products/services offered by the representative (e.g. money transfers, money orders, etc.); date that each of the representative's products was activated for business; the current status of the products available to the representative to conduct business with status change dates (Pending, Active, Suspended, Deactivated [terminated]); local geographic risks (AML/BSA risks associated with the representative's specific geographic area); proximity to suspended representatives or representatives subject to a law enforcement request/subpoena; GTO/external identification (Geographic Targeting Order—an indication that an external source has indicated that the representative's geographic area needs special monitoring); program review findings (the results of an internal AML/BSA compliance review of the representative); program review date (the date of the representative's latest AML/BSA compliance review); and program review history (a comparison of the results of the representative's compliance reviews over time).

Consumer biographical data is data that is useful in determining whether a consumer of a representative may be participating in one or more suspicious money transfer activities. Examples of consumer biographical data may include: consumer identification data such as consumer identification number and/or social security number, name and address, telephone number, etc.; transactions in which the same consumer identification number (or social security number) is used to send multiple transfers (or in which a single consumer uses multiple send identification numbers or social security numbers) within a specified period of time; and transaction in which the same consumer identification number (or social security number) is used to receive multiple transfers (or in which a single consumer uses multiple receiver identification numbers or social security numbers) within a specified period of time.

High volume index data is data that may be useful in determining whether some aspect of the volume of transfers by an representative is indicative of suspicious money transfer activities. Examples of high volume index data may include: average monthly dollar volume of pay and/or send transactions for a product or service; average monthly number of pay and/or send transactions for a product or service; ratio of international versus domestic pay and/or send transactions for a product or service; ratio of pay versus send transactions; the percentage of transactions sent to or received from an HRJ (High Risk Jurisdiction) for a product or service; the percentage of transactions involving HIFCA (High Risk Money-Laundering and Related Financial Crimes Areas) and HIDTA (High Intensity Drug Trafficking Areas) locations; and the percentage of transactions processed outside of the representative's listed business hours.

Historical SAR-MSB compliance data is data that is useful in determining the extent to which a representative is in compliance with MSB and/or SAR reporting requirements. Examples of SAR-MSB compliance data may include: the number and types of SAR's filed; the number and types of other MSB reports filed, number and types of SAR violations in the past year; and the number of fines paid for SAR-MSB violations.

The processes associated with determining a TRI using risk processing system 102 will now be described with reference to FIG. 2. It should be recognized that the specific details involved with these processes are merely exemplary and that many other details may be possible within the scope of the present invention.

Figure 2:
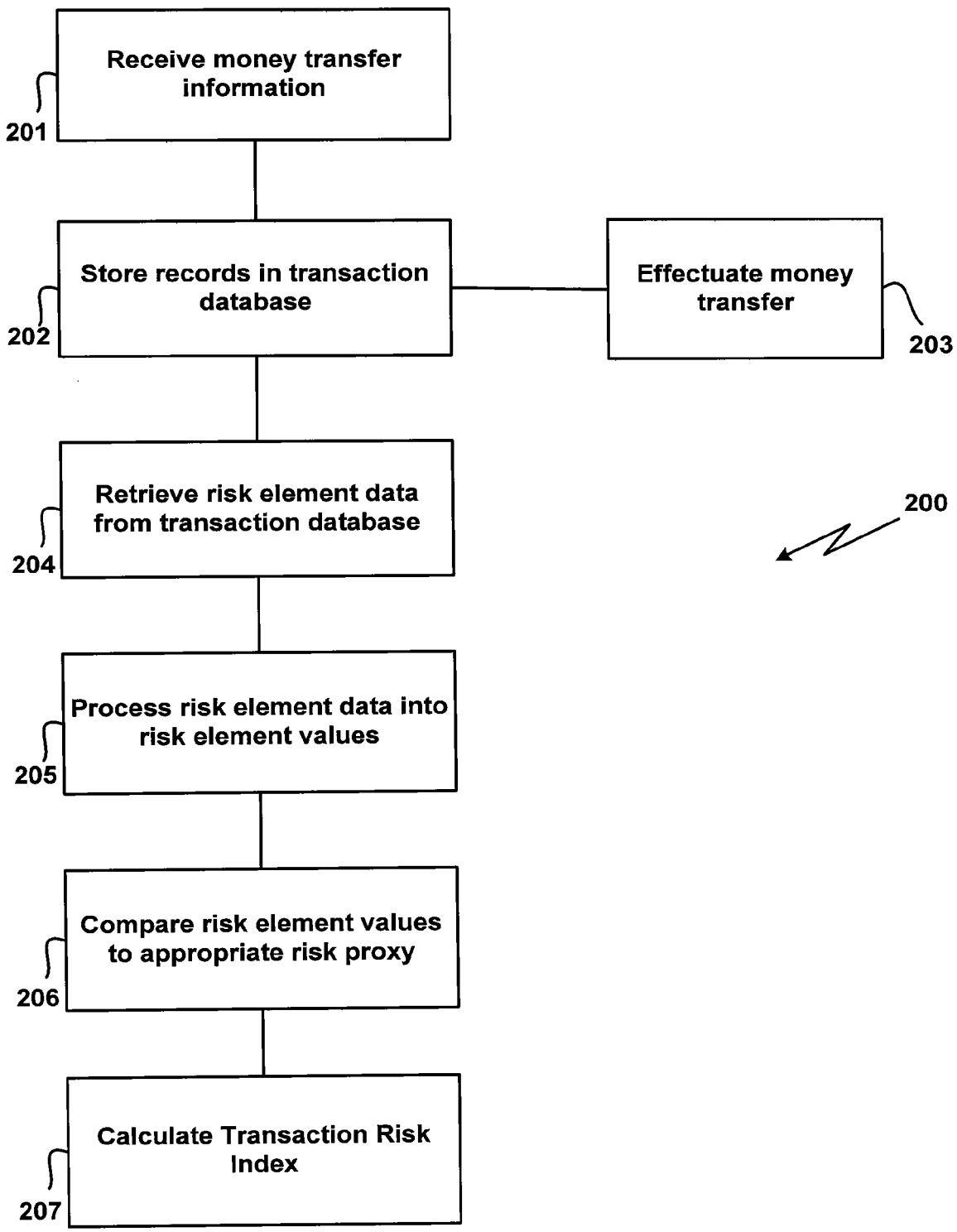
FIG. 2 represents processes associated with a method for determining a TRI for a representative in accordance with the invention.

Referring to FIG. 2, a flow diagram 200 illustrates one embodiment of the present invention. Information related to each of a plurality of money transfer requests handled by a plurality of representatives is received by money transfer system 101 in the manner described above (block 201). The individual money transfer records may be stored on transaction database 105 (block 202). In accordance with the previous discussion of the operation of money transfer system 101, the received and stored money transfer requests (blocks 201, 202) may be effectuated in the normal course of the money transfer transaction (block 203).

In addition, risk element data for transactions conducted by a particular representative may be retrieved from the money transfer records on transaction database 105 (block 204) and used by risk processor 106 to process the risk element data into risk element values (block 205). Risk processor 106 may then compare the risk element values to the appropriate risk proxy (block 206) and calculate a TRI from the results of that comparison. In some embodiments, this process may be performed in real time, or at least once per day when money transfer system 101 is experiencing its lightest load. In this way, interference with the performance of money transfer system 101 is minimized. In some embodiments, the retrieval of risk element data (block 204) may be done each night and only transaction information stored during the preceding twenty-four hour period are retrieved. In other embodiments, the retrieval of risk elements data (block 204) may be done on a weekend, e.g. each Saturday night, and only transaction information stored during the preceding week are retrieved.

In some embodiments, risk element values processed from risk element data by processor 106 (block 205) may be stored as records in risk element value database 107 to facilitate the comparison of risk element values with the appropriate risk proxies (block 206). In one embodiment, risk processor 106 may populate a risk element data table maintained in risk element value database 107, an exemplary embodiment of which is illustrated as Table 300 in FIG. 3. Column 30 of Table 300 contains examples of the types of risk element data for which risk processor 106 processes risk element values. Columns 31-33 of Table 300 contains risk element values calculated by risk processor 106 for each of a plurality of representatives, represented in Table 300 as Representatives A, B and C. As shown in Table 300, risk element values calculated for Representative A may be stored in Column 31; risk element values for Representative B may be stored in Column 32 and risk element values for Representative C may be stored in Column 33. It should be recognized that any number and type of risk element data may be processed, either separately or in combination with other data, to arrive at the risk element values depicted in Table 300.

Column 30 in Table 300 contains several examples of the types of risk element data contemplated by the present invention: the representative's identifying number, ID Number 301; the representative's last name, Name Last 302; the representative's first name, Name First 303; the representative's street address, Address Street 304; the representative's city address, Address City 305; the representative's zip code, Address Zip Code 306; an identifier for the representative's network, Network ID 307; the date the representative joined the network, Start Date 308; the rating resulting from the representative's internal review, Review Rating 309; the date of the representative's last review, Last Review Date 310; the average monthly dollar volume of the representative's pay transactions, Av Mo Pay Vol 311; the average monthly dollar volume of the representative's send transactions, Av Mo Send Vol 312; the average monthly number of the representative's payment transactions, Av Mo Pay Trans 313; the average monthly number of the representative's send transactions, Av Mo Send Trans 314; the ratio of the number of the representative's pay transactions versus send transactions, Pay/Send Ratio 315; the ratio of the number of the representative's international pay transactions versus domestic pay transactions, Intl/Dom Pay Ratio 316; the ratio of the number of the representative's international send transaction versus domestic send transactions, Intl/Dom Send Ratio 317; the number of the representative's transactions involving high risk jurisdictions, HRJ Trans 318; the number of the representative's transactions involving locations designated as High Risk Money-Laundering and Related Financial Crimes Areas or High Intensity Drug Trafficking Areas, HIFCA/HIDTA Trans 319; the percentage of the representative's transactions that are processed outside of listed business hours, % Trans Out Hours 320; the number of transactions in which a Suspicious Activity Report should have been filed but was not, SAR Failures 321; the number of send transactions processed by an representative wherein an illegitimate user seeks to avoid detection through multiple transactions involving an amount of money just under a specified reporting threshold over a specified short period of time, respectively Send $1K Avoidance 322, Send $3K Avoidance 323, and Send $10K Avoidance 324; the number of transactions processed by the representative wherein illegitimate users seek to avoid detection by sharing ID numbers or Social Security numbers, or an individual illegitimate user seeks to avoid detection by using multiple ID numbers or Social Security numbers, respectively, Send ID Sharing 325, Pay ID Sharing 326, Send SSN Sharing 327 and Pay SSN Sharing 328; the number of send or pay transactions processed by the representative involving a single consumer having a transaction dollar value greater than or equal to $25,000 in a 30-day period, respectively, Send>$25K/30 Day 329 and Pay>$25K/30 Day 330; the number of transactions processed by the representative involving a single pay consumer receiving an amount greater than or equal to $3000 in multiple transactions in the same day, with at least one transaction being less than $3000, Rec>$3K/1 Day 331; the number of transactions processed by the representative wherein a single receiving or sending consumer was involved in greater than or equal to 5 transactions in a one-week period, respectively, Rec>5 Trans/Wk 332 and Send>5 Trans/Wk 333; and the number of consumers of the representative that constitute 50% or more of the dollar volume of the representative, No Cons>50% Vol 334.

Those skilled in the art know how to program risk processor 106 to accomplish the various manipulations of money transfer records and the calculations required to process risk element data to obtain the risk element values illustrated in Table 300, or any other risk element values related to any other risk element data selected by the user to evaluate a representative's financial transaction risk in accordance with the present invention. For example, reference may be made to co-pending patent application Ser. No. 10/091,000, filed Mar. 3, 2002 (Patent Application Publication No. US 2003/0167237), incorporated herein by reference in its entirety, which describes money transfer evaluation systems and methods having a fraud processing server that may be capable of accessing money transfer records associated with money transfer system 101 and evaluating the records for suspect money transfers so as to generate risk element data such as those represented by risk element data 322-334 in Table 300. As another example, co-pending patent application Ser. No. 10/658,844, filed Sep. 8, 2003 (Patent Application Publication No. 2004/0215558), incorporated herein by reference in its entirety, describes systems and methods for receiving transaction information and determining, based on the transaction information and certain criteria, whether an SAR should be filed, for example, to determine a risk element value for risk element data 321. As still another example, co-pending patent application Ser. No. 10/424,558, filed Apr. 25, 2003 (Patent Application Publication No. 2004/0215574), incorporated herein by reference in its entirety, describes a computerized method of verifying the representative's identification information, for example, as set forth in risk element data 301-308. Other examples are possible.

In accordance with one embodiment of the invention, risk processor 106 may be configured to determine a risk score associated with each risk element value recorded in Table 300. For example, risk processor 106 may be programmed to compare a risk element value in Table 300 to a predetermined risk proxy, i.e. a value (or range of values) that has been found to represent a specified level of AML/BSA risk. In one embodiment, a risk proxy for each risk element data may be included in a risk proxy database that can be accessed by risk processor 106. Risk processor 106 may use the risk proxy database to compare a risk element value in Table 300 to the appropriate risk proxy in the risk proxy database. The risk proxy database may comprise a risk proxy table, for example as illustrated by Table 400 in FIG. 4. Column 40 of Table 400 contains risk element data 301 and 306-334. Columns 41-43 of Table 400 contain risk proxies for each of the risk element data contained in Column 40. As illustrated in Table 400, the risk proxies may comprise the risk element values or ranges of values that have been predetermined to represent a certain level of AML/BSA risk. Accordingly, Column 41 may contain risk proxies that indicate a low level of AML/BSA risk ("low risk proxy"), Column 42 may contain risk proxies that indicate a moderate level of AML/BSA risk ("moderate risk proxy"), and Column 43 may contain risk proxies that indicate a high AML/BSA risk ("high risk proxy").

As one example, it may have been determined that transactions involving certain geographic locations represent more AML/BSA risk than others. Therefore, as represented in Table 400, an Address Zip Code 306 value of 80202-80230 may have been predetermined to be a low risk proxy (located in Column 41), e.g. because very few transactions in those Zip Codes involve AML/BSA violations. Similarly, an Address Zip Code 306 value of 80246 or 80240 may have been predetermined to be a moderate risk proxy (located in Column 42) because a higher, but acceptable, number of transactions in those Zip Codes involve AML/BSA violations, and an Address Zip Code 306 value of 80010-80020 may have been determined to be a high risk proxy (located in Column 43) because an unacceptably high number of transactions in those Zip Codes involve AML/BSA violations. As a further example, it may be predetermined that more than 10 transactions involving HRJ or HIFCA/HIDTA jurisdictions (i.e. an HRJ Trans 318 value or HIFCA/HIDTA 319 value of >10) is a high risk proxy. A HRJ Trans 318 or HIFCA/HIDTA 319 value in the range of 4-9 may have been predetermined to be a moderate risk proxy. As another example, it may have been predetermined that no more than 1 send or pay transaction greater than $25,000 by a single consumer in a 30-day period (i.e., a Send>$25K/30 Day 329 or Pay>$25K/30 Day 330 value of 0-1) is a low risk proxy. However, a Send>$25K/30 Day 329 or Pay>$25K/30 Day 330 value of 2-3 may have been predetermined to be a moderate risk proxy and a Send>$25K/30 Day 329 or Pay>$25K/30 Day 330 value of >3 may have been predetermined to be a high risk proxy. As a still further example, it may have been predetermined that more than 10 transactions outside of listed business hours (i.e. a % Trans Out Hours 320 value of >10) is high risk proxy, whereas a % Trans Out Hours 320 value of 6-10 is a moderate risk proxy and a % Trans Out Hours 320 value of 0-5 is a low risk proxy.

It should be recognized that the risk proxies contained in Table 400 are merely illustrative of the invention and are only meant to serve as examples of the possible types of risk proxies contemplated by the present invention. Any number of different risk proxies can be devised by one skilled in the art to represent the AML/BSA risk involved with specific risk element data or combinations of risk element data. This allows for a number of different criteria to be used in the evaluation of representative risk in accordance with the invention depending on the needs and objectives of the service provider.

Figure 5:
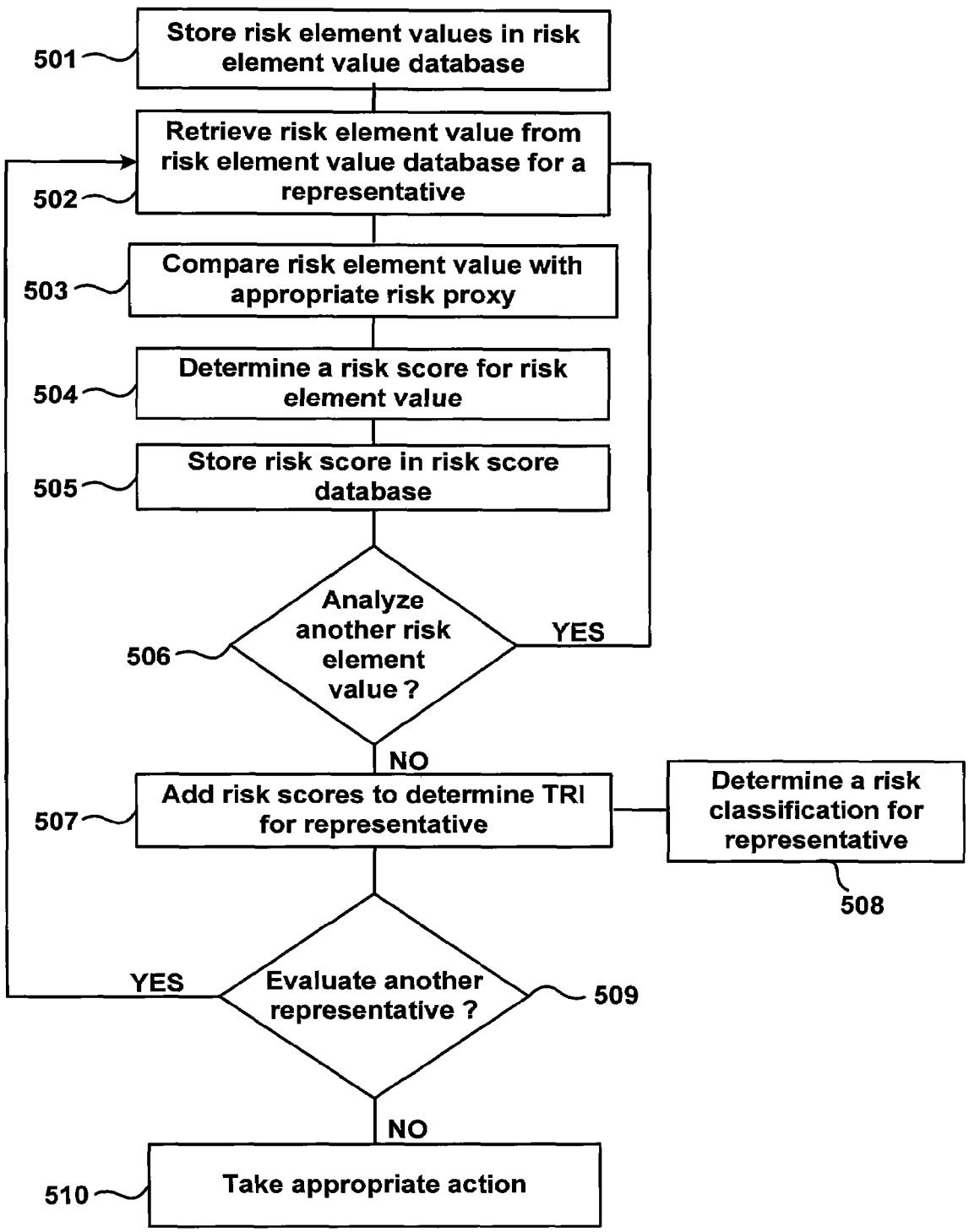
FIG. 5 represents the processes associated with a method of analyzing risk element values in accordance with the invention.

Reference is now made to FIG. 5, which illustrates the processes involved with a method of analyzing risk element values in accordance with one embodiment of the invention. At block 501, risk element values processed by risk processor 106 (block 205, FIG. 2) may be stored in a risk element value table such as Table 300. A risk element value for a representative may be retrieved by risk processor 106 from Table 300 (block 502). As one example, the risk element value for Av Mo Pay Trans 313 for Representative A (20) may be retrieved by risk processor 106 from Column 31 of Table 300. As indicated at block 503, risk processor 106 may then compare the risk element value with the appropriate risk proxy for that risk element data. For example, the Av Mo Pay Trans 313 value of 20 retrieved from Column 31 of Table 300 may be compared with the risk proxies located in Columns 41-43 of Table 400 for risk element Av Mo Pay Trans 313 located in Column 40 of Table 400.

At block 504, risk processor 106 may then assign a risk score to the risk element value based on the comparison of the risk element value to the appropriate risk proxies in block 503. For purposes of this illustration only, risk processor 106 may be programmed to assign a risk score of 0 to a risk element value that corresponds to a low risk proxy in Column 41 of Table 400, to assign a risk score of 0.5 to a risk element value that corresponds to a moderate risk proxy in Column 42 of Table 400, and to assign a risk score of 1.0 to a risk element value that corresponds to a high risk proxy in Column 43 of Table 400. For example, the Av Mo Pay Trans 313 value of 20 for Representative A falls within the range of the moderate risk proxy of 10-30 set forth in Column 42 of Table 400. Accordingly, risk processor 106 would assign a risk score of 0.5 to that risk element value.

At block 505, risk processor 106 may store the risk score in a database, e.g. the exemplary risk score database illustrated by Table 600 in FIG. 6. For example, the risk score of 0.5 determined for Av Mo Pay Trans 313 may be stored for Representative A in Column 61 of Table 600.

The determination by processor 106 may then be made whether to analyze another risk element value for the same representative (block 506). If yes, the process steps (blocks 502-506) may be repeated for one or more other risk element values for that representative stored in the risk element value database. For example, the No Cons>50% Vol 334 value (12) may be retrieved by risk processor 106 from Column 31 of Table 300 and compared with the risk proxies in Columns 41-43 of Table 400 for No Cons>50% 334 in Column 40 of Table 400. Since the No Cons<50% Vol 334 value of 12 falls within the range of 5-29 indicated in Column 42 of Table 400, risk processor 106 determines a risk score of 0.5. This risk score may then be stored by risk processor 106 in Column 61 of Table 600 for No Cons>50% Vol 334 in Column 60.

The process described above may be repeated until each of the risk element values in Column 31 of Table 300 have been compared with the corresponding risk proxies in Columns 41-43 of Table 400 to determine individual risk scores for each of the risk element values, and those risk scores have been stored in Column 61 of Table 600.

In one embodiment, after all risk scores have been stored in Table 600, risk processor 106 may calculate a Transaction Risk Index (TRI) for the representative by adding together all of the individual risk scores determined for each risk element value (block 507). For example, a TRI value of 3.0 may be calculated for Representative A by adding together all of the risk scores stored in Column 61 of Table 600. Optionally, risk processor 106 may determine a risk classification for the representative based on its TRI value (block 508). For example, as illustrated in Table 600, risk processor 106 may be programmed to assign a low risk classification to TRI values falling in the range of 1-5, a moderate risk classification to TRI values falling in the range of 6-10 and a high risk classification to TRI values greater than 10. When programmed this way, the TRI value of 3.0 calculated for Representative A may be used by risk processor 106 to classify Representative A as having a low risk of potential AML/BSA violations in the conduct of financial transaction on behalf of the service provider.

At block 509, the determination may be made whether to evaluate one or more other representatives. If yes, the above-described process (blocks 501-507) may be repeated for each representative being evaluated. For example, the risk element values associated with each risk element data 301-334 for Representative B may be retrieved by risk processor 106 from Column 32 of Table 300 and those risk element values may be compared with the appropriate risk proxies in Column 41-43 of Table 400 to obtain the corresponding risk scores. The risk scores determined for each risk element value for Representative B may then be stored in Column 62 of Table 600, and a TRI value may be calculated by risk processor 106 for Representative B by adding together all of the individual risk scores in Column 62. For example, a TRI value for Representative B may be calculated to be 6.5 based on the sum of the exemplary risk scores entered in Column 62 of 600 in FIG. 6. As described above, this TRI value may be used by risk processor 106 to classify Representative B as being a moderate risk representative.

Similarly, the risk element values for each risk element data 301-334 for Representative C may be retrieved by risk processor 106 from Column 33 of Table 300 and those values may be compared with the appropriate risk proxies in Columns 41-43 of Table 400 to obtain the corresponding risk scores for each risk element value. The risk scores assigned to each risk element value for Representative C may then be stored in Column 63 of Table 600, and a TRI value may be calculated by processor 106 for Representative C by adding together all of the individual risk scores in Column 63. For example, a TRI value for Representative C may be calculated to be 14 based on the sum of the exemplary risk scores stored in Column 63 of Table 600 in FIG. 6. As described above, this TRI value may be used to classify Representative C as representing high risk.

Referring again to FIG. 5, after the desired number of representatives have been evaluated, the TRI value and/or the risk classification may be used to determine the appropriate action to be taken by the service provider relative to each representative (block 510). For example, it may be determined that no action will be taken by the service provider with regard to all representatives, such as Representative A, falling in the low risk classification. It may also be determined that additional compliance training, increased oversight and/or other remedial action will be provided by the service provider for all representatives, such as Representative B, falling in the moderate risk category, and that all representatives, such as Representative C, falling in the high risk category will be removed from the service provider's financial transaction network.

As stated before, the examples given in connection with the above description are merely illustrative embodiments of the systems and methods that may be used to practice of the present invention. It should be recognized, for example, that risk processor 106 may be configured in a different manner than describe above, and that any number and type of risk element data, risk proxies, risk scores, etc. may be used in accordance with the present invention. Indeed, one of ordinary skill in the art will recognize a myriad of risk element data that may be analyzed within the scope of the invention, and will be able to devise a wide variety of appropriate risk proxies designed to measure the AML/BSA risk involved with those risk elements. Similarly, many different risk scores may be assigned to each risk proxy depending on the experience of the service provider, the objectives and purposes of the representative evaluation, and other variables. Different weight and importance may be given to different risk element values, and corresponding risk proxies and associated risk scores may be chosen by the service provider to reflect those differences when calculating a TRI. As one example, a single risk element may result in a TRI that represents high enough risk to be unacceptable. Furthermore, the various components of the systems and processes may be changed and updated from time to time to reflect changes conditions and/or new information.

Accordingly, the invention has been described in detail for purposes of clarity and understanding. However, it will be appreciated that certain changes and modifications may be practiced within the scope of the appended claims. Thus, although the invention is herein described with reference to specific embodiments and examples thereof, the embodiments and examples are merely illustrative, and not limiting of the invention. Rather, the scope of the invention is to be determined solely by the appended claims.

What is claimed is:

1. A method for a financial transaction service provider to evaluate the risk of conducting money transfer transactions through representatives, the method comprising:
   receiving information generated by a money transfer system regarding a plurality of prior financial transactions conducted by one or more representatives on behalf of the service provider, wherein the information includes risk element data;
   electronically storing records of the information in a transaction database;
   configuring a risk processor to access the transaction database and retrieve risk element data related to prior transactions conducted by a first representative on behalf of the service provider;
   establishing a plurality of risk proxies, wherein the risk proxies represent transaction risks associated with the one or more representatives, including at least an average number of money transfer transactions during a first specified time period and an average money transfer volume amount during a second specified time period, and establishing a plurality of specified risk values for each risk proxy, each specified risk value indicating a risk score associated with that risk proxy; and
   using the risk processor to perform an analysis of the risk element data related to prior transactions conducted by the first representative, wherein the risk processor is configured to process the risk element data into a one or more risk element value corresponding to each risk proxy and to the transaction risk represented by that risk proxy, and is further configured to calculate a Transaction Risk Index for the first representative, by comparing each specified risk element value of the first representative to the corresponding risk proxy to determine the risk score associated with the first representative for that risk proxy and by then combining the determined risk scores to produce the Transaction Risk Index for the first representative.

2. The method of claim 1, wherein the risk element data relates to AML/BSA risk.

3. The method of claim 1 further comprising configuring the risk processor to retrieve risk element data from the transaction database related to transactions conducted by another representative on behalf of the service provider, and performing an analysis of the risk element data using the risk processor to calculate a Transaction Risk Index for said other representative.

4. The method of claim 1 farther comprising using the Transaction Risk Index to take corrective action with regard to the representative.

5. The method of claim 1 wherein the risk element data is processed to obtain a plurality of risk element values for the representative, and the Transaction Risk Index for the representative is calculated by comparing each of the risk element values to a risk proxy, determining an individual risk score for each risk element value based on the comparison, and adding together the individual risk scores determined for all risk element values to obtain a total value equal to the Transaction Risk Index.

6. The method of claim 1, wherein the Transaction Risk Index is used to determine a risk classification for the representative.

7. The method of claim 6 further comprising using the risk classification to take corrective action with regard to the representative.

8. The method of claim 1, wherein the first specified time period and the second specified time period are the same.

9. A method of determining a Transaction Risk Index for financial transaction representatives of a financial transaction service provider, the method comprising:
   receiving information generated by a money transfer system regarding a plurality of prior financial transactions conducted by one or more representatives on behalf of the service provider, wherein the information includes risk element data;
   electronically storing records of the financial transaction information in a transaction database; and
   configuring a risk processor to:
   access the transaction database;
   retrieve risk element data related to prior transactions conducted by one or more representatives on behalf of the service provider;
   process the risk element data into a plurality of risk element values for each of the representatives;
   store the risk element values in a risk element value database;
   retrieve each risk element value for one representative from the risk element value database and compare the risk element value to a risk proxy that represents a specified level of risk to calculate a corresponding risk score for each risk element value for that representative, wherein the risk proxy represents transaction risks associated with the one or more representatives and is selected from a group comprising (a) representative complicity data, (b) consumer biographical data, (c) high volume index data, and (d) historical SAR-MSB compliance data; and
   add together the risk scores calculated from each representative's risk element values to obtain a Transaction Risk Index for each representative.

10. A system for a financial transaction service provider to evaluate the risk of conducting financial transaction through representatives, the system comprising:
   a money transfer system adapted to generate information regarding a plurality of prior financial transactions conducted by one or more representatives on behalf of the service provider, wherein the information includes risk element data, and to store records of the information in a transaction database; and
   a risk processing system comprising a risk processor configured to access the transaction database and retrieve risk element data related to prior financial transactions conducted by a first representative on behalf of the service provider, wherein the risk processor is further configured to process the risk element data into one or more risk element values and calculate a Transaction Risk Index for the first representative by comparing one or more of the risk values of the first representative to risk proxies that each represents a specified level of risk;
   wherein the risk proxies are selected from the group consisting of a specified amount of average monthly dollar volume or number of pay or send transactions; a specified ratio of international transactions to domestic transactions; a specified ratio of pay transactions to send transactions; a specified number of transactions involving HRJ, HIFCA or HIDTA locations; a specified percentage of transactions processed outside of listed business hours; a specified number of SAR and/or MSB reports; a specified result from an internal review procedure; a specified proximity to suspended representatives; a specified number of detected incidents involving suspected structuring or detection avoidance activities; a specified number of transactions over a specified dollar amount involving a single consumer within a certain time period; a specified number of consumers comprising a majority of a representative's volume; and combinations thereof.

11. The system of claim 10, wherein the risk element data relates to AML/BSA risk.

12. The system of claim 10, wherein the risk processor is configured to retrieve risk element data from the transaction database related to prior transactions of another representative of the service provider, and to perform an analysis of the risk element data to calculate a Transaction Risk Index for said other representative.

13. The system of claim 10, wherein the risk processor is configured to process the risk element data to obtain a plurality of risk element values for the representative, and to calculate the Transaction Risk Index for the representative by comparing each of the risk element values to a risk proxy, to determine an individual risk score for each risk element value based on the comparison, and to add together the individual risk scores determined for all risk element values to obtain a total value equal to the Transaction Risk Index.

* * * * *

UNITED STATES PATENT AND TRADEMARK OFFICE
CERTIFICATE OF CORRECTION

PATENT NO. : 7,620,596 B2
APPLICATION NO. : 11/757255
DATED : November 17, 2009
INVENTOR(S) : Sean Knudson et al.

It is certified that error appears in the above-identified patent and that said Letters Patent is hereby corrected as shown below:

Column 15, claim 1, lines 40-41, delete "one or more"

Column 15, claim 1, line 45, delete "specified"

Column 15, claim 4, line 60, delete "farther" and insert --further--

Column 16, claim 10, line 62, after "representative to" insert --one or more--

Signed and Sealed this

Twenty-seventh Day of April, 2010

David J. Kappos
*Director of the United States Patent and Trademark Office*